United States Patent [19]
Bonas et al.

[11] Patent Number: 5,178,547
[45] Date of Patent: Jan. 12, 1993

[54] INITIATOR ASSEMBLY WITH CONNECTOR INTERFACE ELEMENT

[75] Inventors: Andrew B. Bonas; Brian R. Pitstick, both of Mesa, Ariz.

[73] Assignee: TRW Inc., Lyndhurst, Ohio

[21] Appl. No.: 759,494

[22] Filed: Sep. 13, 1991

[51] Int. Cl.⁵ .............................................. B60R 21/26
[52] U.S. Cl. ...................................... 439/34; 102/531; 280/735; 422/166
[58] Field of Search ................ 280/735, 741; 422/164, 422/165, 166; 102/530, 531; 439/34

[56] References Cited

U.S. PATENT DOCUMENTS

| | | | |
|---|---|---|---|
| 4,561,675 | 12/1985 | Adams et al. | 280/741 |
| 4,578,247 | 3/1986 | Bolieau | 422/165 |
| 4,690,063 | 9/1987 | Granier et al. | 102/530 |
| 4,734,265 | 3/1988 | Nilsson et al. | 280/735 |
| 5,000,695 | 3/1991 | Nishiyama et al. | 439/606 |
| 5,056,815 | 10/1991 | Geisreiter | 280/741 |
| 5,062,367 | 11/1991 | Hayashi et al. | 422/164 |
| 5,100,174 | 3/1992 | Jasken et al. | 280/741 |

Primary Examiner—Gary F. Paumen
Attorney, Agent, or Firm—Tarolli, Sundheim & Covell

[57] ABSTRACT

An inflator for inflating a vehicle air bag discharges, when actuated, gas to inflate the air bag. An initiator has a terminal for electrical contact with an electrical connector of the vehicle circuitry. The initiator is actuatable in response to receiving an electrical signal from the connector through the terminal to initiate actuation of the inflator. A latch pin is attached by a body of plastic material to the initiator. The latch pin maintains the connector in electrical contact with the terminal of the initiator. The latch pin is preferably made of a material different from the body of plastic material.

14 Claims, 4 Drawing Sheets

INITIATOR ASSEMBLY WITH CONNECTOR INTERFACE ELEMENT

BACKGROUND OF THE INVENTION

1. Technical Field

The present invention relates to apparatus for association with an electrical connector. The present invention relates particularly to an inflator for discharging gas to inflate an air bag to protect an occupant of a vehicle during a collision or the like in response to receiving an electrical signal through an electrical connector.

2. Description of the Prior Art

It is well known to protect a vehicle occupant by an air bag that is inflated when the vehicle decelerates suddenly, as in a collision. The air bag restrains movement of the vehicle occupant during the collision. The air bag is inflated by gas from an air bag inflator. The gas is released from a container in the inflator and/or generated by ignition of combustible gas generating material in the inflator. The inflator uses an electrically actuatable initiator to open the container and/or ignite the ga generating material.

A known initiator for igniting gas generating material in an air bag inflator has two metal terminals. The terminals are in electrical contact with a known electrical connector which receives an electrical signal from vehicle circuitry including a deceleration sensor. Upon deceleration of the vehicle at a rate above a predetermined rate, the deceleration sensor closes and completes a circuit to permit an electrical signal to pass through the connector and the terminals to the initiator. The electrical signal actuates the initiator, which ignites a gas generating material.

The known initiator has structure which physically maintains the electrical connector in electrical contact with the terminals of the initiator. The initiator has a plastic material injection molded around the initiator and the initiator terminals. A portion of the molded plastic material forms the structure which physically maintains the electrical connector in electrical contact with the terminals of the initiator.

The known initiator is sensitive to high pressures and high temperatures. Thus, the molding of the plastic material around the initiator must take place at relatively low pressures and temperatures. Materials which mold well at these relatively low pressures and temperatures are not well suited for forming the structure which maintains the electrical connector in electrical contact with the terminals of the initiator.

SUMMARY OF THE INVENTION

The present invention is an apparatus for association with an electrical connector and, when actuated, for initiating actuation of an inflator for discharging gas to inflate a vehicle occupant restraint such as an air bag. The apparatus includes an initiator actuatable to initiate actuation of the inflator in response to receiving an electrical signal. The initiator has an electrical terminal for electrical contact with the electrical connector. The terminal receives the electrical signal from the electrical connector. The apparatus includes means for supporting the initiator adjacent the inflator. The supporting means is attached to the initiator by a body of plastic material. An interface element maintains the electrical connector in electrical contact with the terminal. The body of plastic material has a portion attaching the interface element to the initiator.

In a preferred embodiment of the invention, the interface element is made of a different material than the body of plastic material. Thus, the interface element can, for example, be molded at relatively high pressures and temperatures for increased consistency, strength, and dimensional stability, while the molding of the plastic material around the initiator can take place at relatively low pressures and temperatures suitable for the initiator.

BRIEF DESCRIPTION OF THE DRAWINGS

Further features of the present invention will become apparent to those skilled in the art to which the present invention relates from reading the following specification with reference to the accompanying drawings, in which.

DESCRIPTION OF A PREFERRED EMBODIMENT OF THE INVENTION

Figure 1:
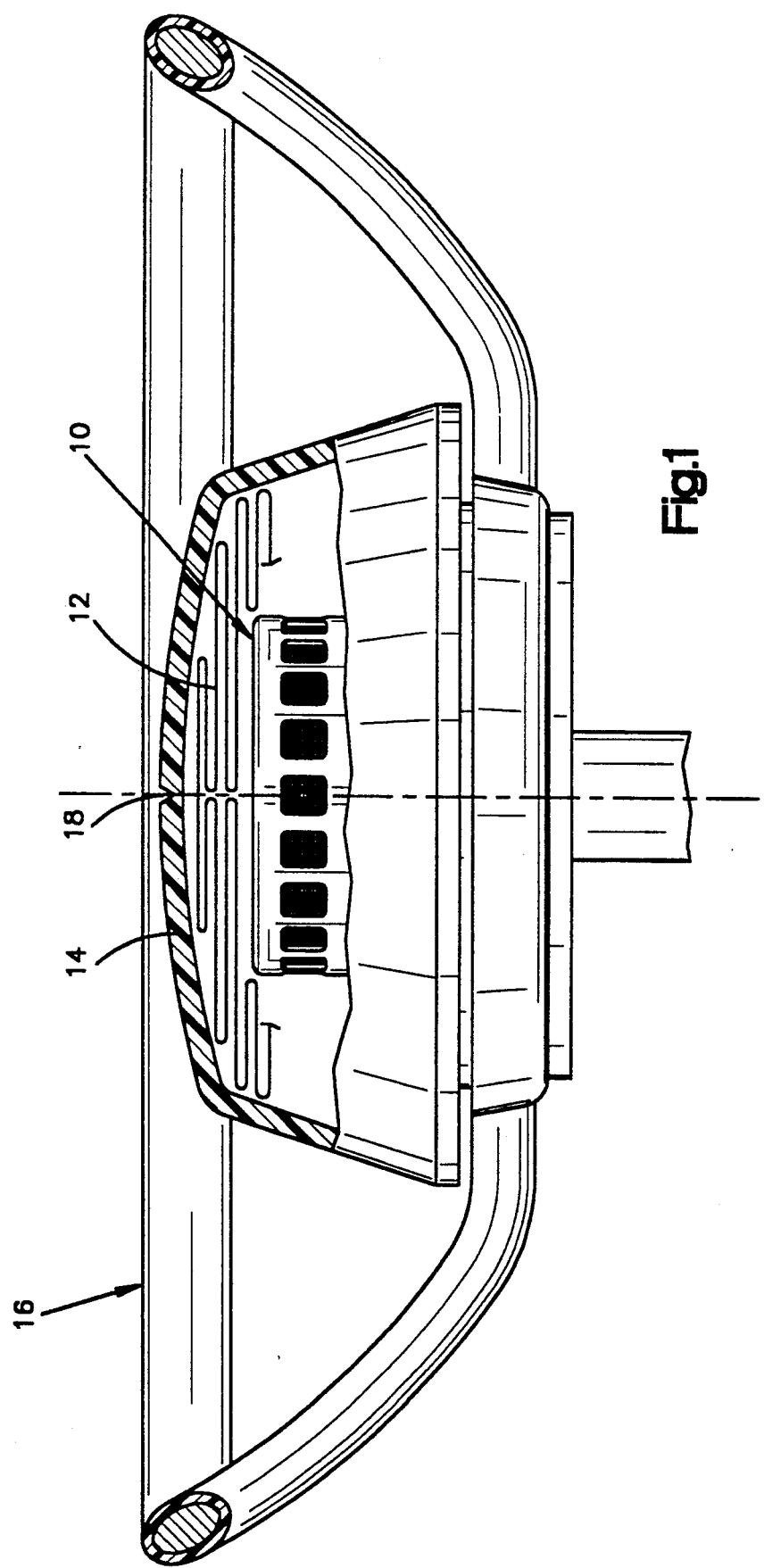
FIG. 1 is a transverse view, partially in section, of a vehicle steering wheel with an inflatable occupant restraint module incorporating an inflator that uses an initiator assembly constructed in accordance with the present invention.

The present invention relates to an air bag inflator for discharging gas to inflate an air bag to protect the driver of a vehicle during a sudden vehicle deceleration such as when the vehicle is involved in a collision. The present invention is applicable to various inflator constructions, including inflators of different shapes and sizes and inflators with different modes of operation. For example, the invention can be applied to inflators which release gas from a container and/or which generate gas by ignition of combustible gas generating material. As representative of the present invention, FIG. 1 illustrates an inflator 10. An air bag 12 is folded around the inflator 10. A cover 14 encloses the air bag 12 and the inflator 10. The inflator 10, the air bag 12, and the cover 14 are components of a module which is mounted on a vehicle steering wheel 16.

Upon the occurrence of sudden vehicle deceleration, such as occurs in a collision, the inflator 10 is actuated and discharges a large volume of gas. The gas from the inflator 10 expands the air bag 12. As the air bag 12 starts to expand, it breaks weakened portions in the cover 14. One of the weakened portions is designated 18 in FIG. 1. As the air bag 12 continues to expand, it moves into the space between the driver of the vehicle and the steering wheel 16 to restrain movement of the driver, as is known.

The inflator 10 (FIG. 2) includes a housing 40. The housing 40 is made of three pieces, namely, a diffuser cup 42, a combustion cup 44, and a combustion chamber cover 46. The diffuser cup 42, the combustion cup 44, and the combustion chamber cover 46 are made of a metal, such as UNS S30100 stainless steel.

The diffuser cup 42 is generally cup-shaped and has a cylindrical side wall 50 extending around the central axis 52 of the inflator 10. The side wall 50 extends between a flat upper end wall 54 and a flat lower flange 56. An inner annular surface 55 on the upper end wall 54 of the diffuser cup 42 defines a central opening 57 in the upper end wall 54 of the diffuser cup 42. The end wall 54 and the flange 56 are generally parallel to each other and perpendicular to the axis 52. An annular array of gas outlet openings 58 is located in an upper portion of the diffuser cup side wall 50.

The combustion cup 44 is generally cup-shaped and is disposed inside the diffuser cup 42. The combustion cup 44 has a cylindrical side wall 60 extending around the axis 52. The cylindrical side wall 60 extends between a flat upper end wall 64 and a flat lower flange 66. The upper end wall 64 and the lower flange 66 are generally parallel to each other and perpendicular to the axis 52. An annular array of openings 68 is located in a lower portion of the combustion side wall 60.

The upper end wall 64 of the combustion cup 44 is welded with a continuous weld to the annular surface 55 on the upper end wall 54 of the diffuser cup 42 at a circumferential weld location 70, preferably by laser welding. The combustion cup flange 66 is welded with a continuous weld to the diffuser cup flange 56 at a circumferential weld location 72, also preferably by laser welding.

The combustion chamber cover 46 is a generally flat metal piece having a circular center portion 80 and a parallel but slightly offset circular outer flange 82. A circular opening 84 is located in the center portion 80 of the chamber cover 46. The outer flange 82 of the chamber cover 46 is welded with a continuous weld to the combustion cup flange 66 at a circumferential weld location 86, again preferably by laser welding.

A hermetically sealed canister 90 is disposed in the combustion cup 44. The canister 90 is made of two pieces, namely a lower canister section 92 and a cover 94. The radially outer edge of the canister cover 94 is crimped to an adjacent edge of the canister lower section 92 to seal the canister 90 hermetically. The canister 90 is preferably made of relatively thin aluminum.

The canister lower section 92 has a cylindrical outer side wall 96 adjacent to and inside the combustion cup side wall 60. The side wall 96 has a reduced thickness in the area adjacent the openings 68 in the combustion cup side wall 60. The canister lower section 92 also has a cylindrical inner side wall 98 spaced radially inwardly from the outer side wall 96. The side wall 98 has a reduced thickness in the area adjacent an igniter or initiator 142.

A flat ring-shaped lower wall 100 of the canister lower section 92 interconnects the outer side wall 96 and the inner side wall 98. A circular inner top wall 102 of the canister lower section 92 extends radially inwardly from and caps the inner side wall 98. The inner top wall 102 and the cylindrical inner side wall 98 define a downwardly opening central recess 104 in the canister 90.

The canister cover 94 is generally circular in shape. A recess 106 is located in the center of the canister cover 94. A packet 108 of auto ignition material is located in the recess 106 and held in the recess 106 by a piece of aluminum foil tape 109.

A plurality of annular disks 110 of gas generating material are stacked atop each other within the canister 90. An annular cushion 112 is disposed between the uppermost gas generating disk 114 and the inside of the canister cover 94. The disks 110 are made of a known material which when ignited generates nitrogen gas. Although many types of gas generating material could be used, suitable gas generating materials are disclosed in U.S. Pat. No. 3,895,098.

An annular prefilter 120 is disposed in the canister 90. The prefilter 120 is located radially outward of the gas generating disks 110 and radially inward of the outer side wall 96 of the canister 90. A small annular space exists between the prefilter 120 and the outer side wall 96.

An annular slag screen indicated schematically at 122 is located in the diffuser cup 42, outside of the combustion cup 44. The slag screen 122 is radially outward of the openings 68 and lies against the combustion cup side wall 60. However, the slag screen 122 could be spaced away from the openings 68 in the combustion cup side wall 60.

An annular final filter assembly indicated schematically at 124 is located inside the diffuser cup 42 above the slag screen 122. The final filter assembly 124 is radially inward of the gas outlet openings 58 in the side wall 50 of the diffuser cup 42. The final filter assembly 124 is a plurality of layers of various materials. The layers extend around the diffuser cup side wall 50 and are located inside the side wall. The detailed structure of the final filter assembly 124 does not form a part of the present invention and therefore will not be described in detail.

An annular filter shield 126 projects radially inwardly from the diffuser cup side wall 50 and separates the final filter assembly 124 and the slag screen 122. An annular graphite seal 128 seals the gap between the upper edge of the final filter assembly 124 and the inside of the diffuser upper end wall 54. Another annular graphite seal 130 seals the gap between the lower edge of the final filter assembly 124 and the upper side of the filter shield 126.

The inflator 10 includes an initiator assembly 140. The initiator assembly 140 projects through the opening 84 in the chamber cover 46 into the central recess 104 of the canister 90. The initiator assembly 140 is welded with a continuous weld, preferably a laser weld, to the center portion 80 of the chamber cover 46 at a circumferential weld location 143.

The initiator assembly 140 includes the igniter or initiator 142. The igniter 142 may be of any suitable well known construction. The igniter 142 has a pair of metal terminals 144 (seen in FIGS. 2 and 4) and 146 (seen in FIGS. 3 and 4). The terminals 144 and 146 are connectable to a deceleration sensor (not shown) by a connector 152 (FIGS. 3 and 4). The terminals 144 and 146 are also connected to a resistance wire embedded in an ignition material in the igniter 142.

The electrical connector 152 is connected to vehicle circuitry (not shown) for receiving an electrical signal to actuate the igniter 142. The connector 152 is a commercially available part and is typically supplied by the manufacturer of the vehicle in which the inflator 10 is mounted. One such connector is made by Amphenol-Tuchel Electronics GmbH under Drawing Part No. M-Ca 252-02 (91) and Name "2-way Connector-Airbag".

Upon the occurrence of a collision or other sudden vehicle deceleration, an electrical current flows through the connector 152 and through the terminals 144 and 146 to the igniter 142. The resistance wire heats up and sets off the ignition material which deflagrates a charge in the igniter 142. Deflagration of the charge forms hot gas products which flow outwardly from the igniter 142 and rupture the inner top wall 102 and the inner side wall 98 of the canister 90. The hot gas from the igniter 142 ignites the disks 110 of gas generating material. The disks 110 of ga generating material rapidly produce a large volume of another hot gas.

The pressure of the gas acts on the cylindrical side wall 96 of the canister 90, forcing the side wall 96 radially outwardly against the combustion cup side wall 60. This results in the thin side wall 96 of the canister 90 being ruptured or blown out at the openings 68 in the combustion cup side wall 60. The reduced thickness of the side wall 96 adjacent the openings 68 allows this portion of the side wall 96 to rupture in preference to other portions at a desired pressure. The gas generated by burning of the disks 110 then flows radially outwardly through the prefilter 120. The prefilter 120 removes from the flowing gas some combustion products of the initiator assembly 140 and of the gas generating disks 110. The prefilter 120 also cools the flowing gas. When the gas cools, molten products are plated onto the prefilter 120. The gas flows through the openings 68 and into the slag screen 122.

The slag screen 122 removes and traps particles from the flowing gas. The slag screen also cools the flowing gas. When the gas cools, molten combustion products are plated onto the slag screen 122. The filter shield 126 between the slag screen 122 and the final filter assembly 124 causes turbulent flow of gas to occur in and around the slag screen 122. The turbulent gas flow promotes the retention of relatively heavy particles in the slag screen 122 and in the lower portion of the diffuser cup 42.

The gas flows axially upwardly from the slag screen 122 to the final filter assembly 124. The gas then flows radially outwardly through the final filter assembly 124 which removes small particles from the gas. The final filter assembly 124 also further cools the gas so that molten products in the gas may deposit on parts of the final filter assembly 124. The annular array of gas outlet openings 58 directs the flow of gas into the air bag 12 to inflate the air bag 12.

Figure 6:
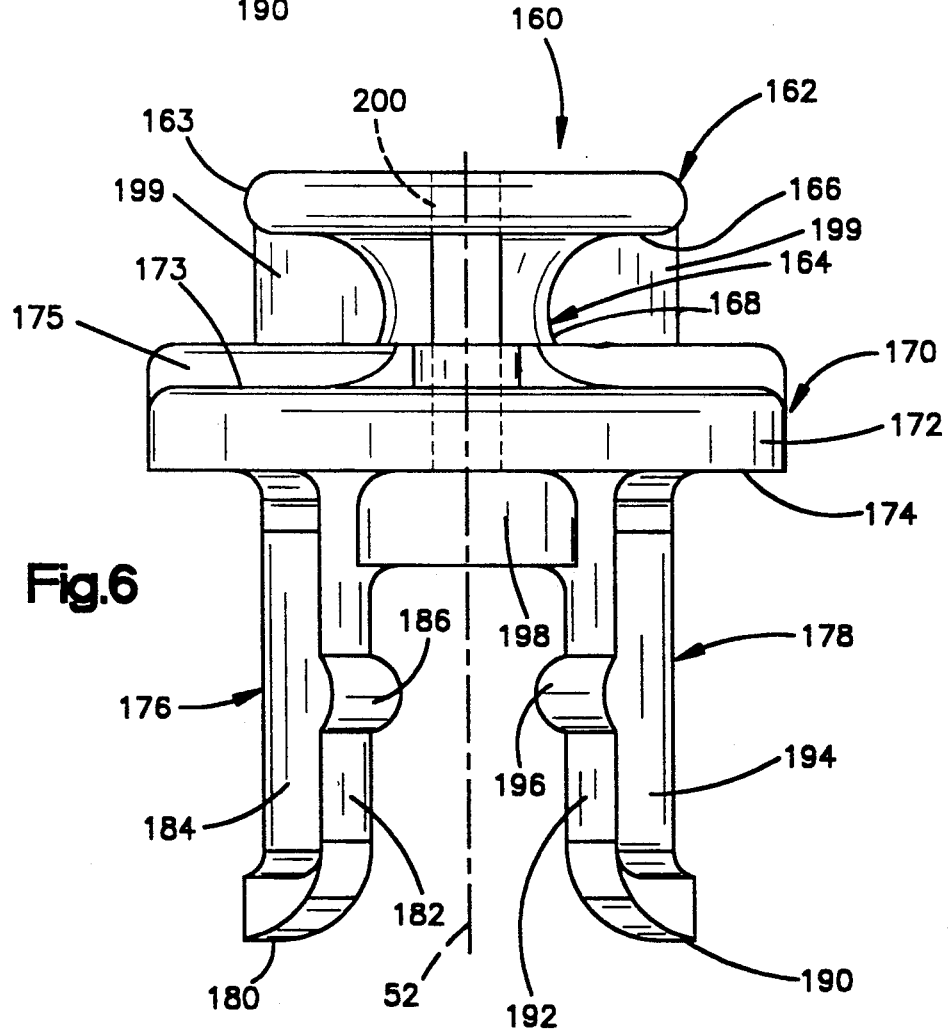
FIG. 6 is a side elevational view of the interface element of FIG. 5.

In accordance with the present invention, the initiator assembly 140 includes an interface element for maintaining the electrical connector 152 in electrical contact with the terminals 144 and 146 of the igniter 142. In the preferred embodiment, the interface element is a latch pin 160. The latch pin 160 has a disk-shaped head portion 162 (FIG. 6) with an annular outer circumferential surface 163. A reduced diameter neck portion 164 extends from a lower surface 166 of the head portion 162. The neck portion 164 has an outer surface 168. The neck portion 164 joins the head portion 162 to a body portion 170 of the latch pin 160. The body portion 170 has an annular outer circumferential surface 172, a generally planar upper surface 173, and a generally planar lower surface 174.

The body portion 170 includes four radially extending abutments 175. The abutments 175 are equally circumferentially spaced around the body portion 170. The abutments 175 project axially upward from the upper surface 173 of the body portion 170. The abutments 175 extend radially outwardly from the neck portion 164 to the circumferential outer surface 172 of the body portion 170.

The neck portion 164 includes four web portions 199 which extend axially between the lower surface 166 of the head portion 162 and respective ones of the abutments 175. The web portions 199 extend radially outwardly from the neck portion 164 to the outer circumferential surface 163 of the head portion 162.

A pair of diametrically opposed legs 176 and 178 extend axially from the lower surface 174 of the body portion 170 of the latch pin 160. The leg 176 terminates in a radially outwardly projecting foot 180. The leg 176 has a radially inner side 182 and a radially outer side 184. There is an arcuate rib 186 extending across the inner side 182. The leg 178 similarly terminates in a radially outwardly projecting foot 190. The leg 178 has a radially inner side 192 and a radially outer side 194. There is an arcuate rib 196 extending across the inner side 192. A reinforcing rib 198 extends between the two legs 176 and 178, along the lower surface 174 of the body portion 170.

Two passages 200 and 204 extend axially through the head portion 162, neck portion 164, and body portion 170 of the latch pin 160. The terminal 144 extends through the passage 200 which is formed in part by cutting away a part of one of the web portions 199. The terminal 146 extends through the passage 204 which is formed in part by cutting away a part of the diametrically opposite web portion 199.

Figure 2:
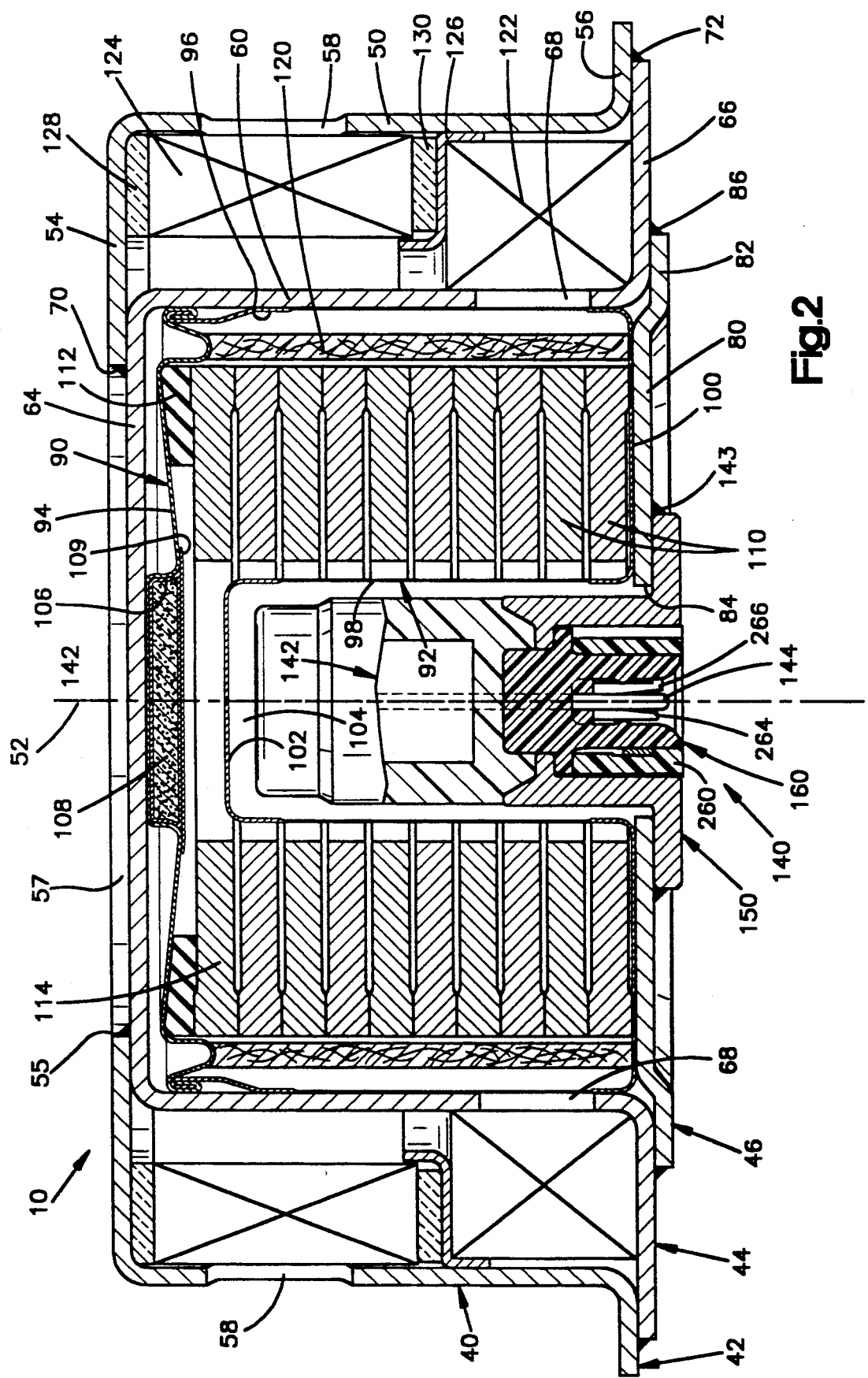
FIG. 2 is a transverse axial sectional view of the inflator of FIG. 1.
Figure 3:
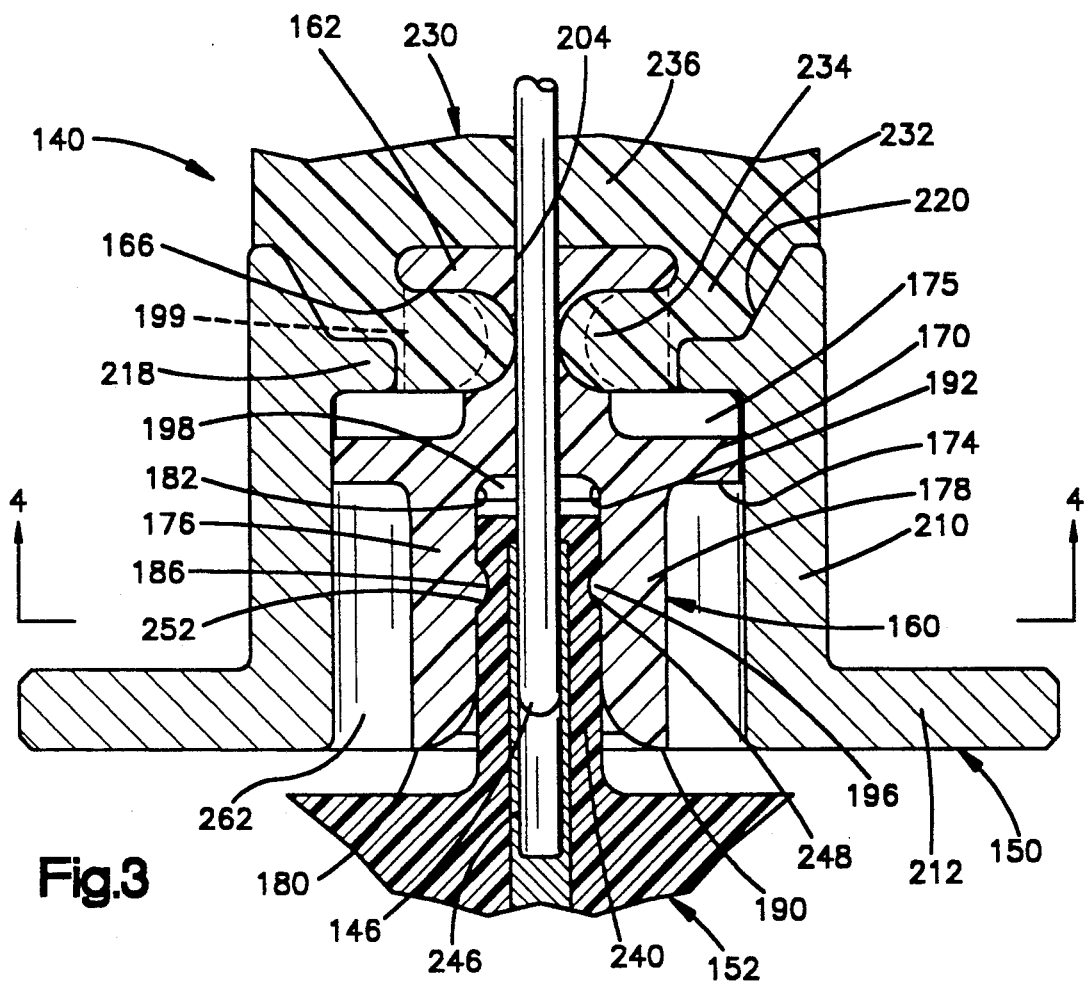
FIG. 3 is an enlarged sectional view of a portion of the initiator assembly of FIG. 2 and illustrating an electrical connector of the vehicle circuitry, as seen along line 3—3 of FIG. 4.
Figure 4:
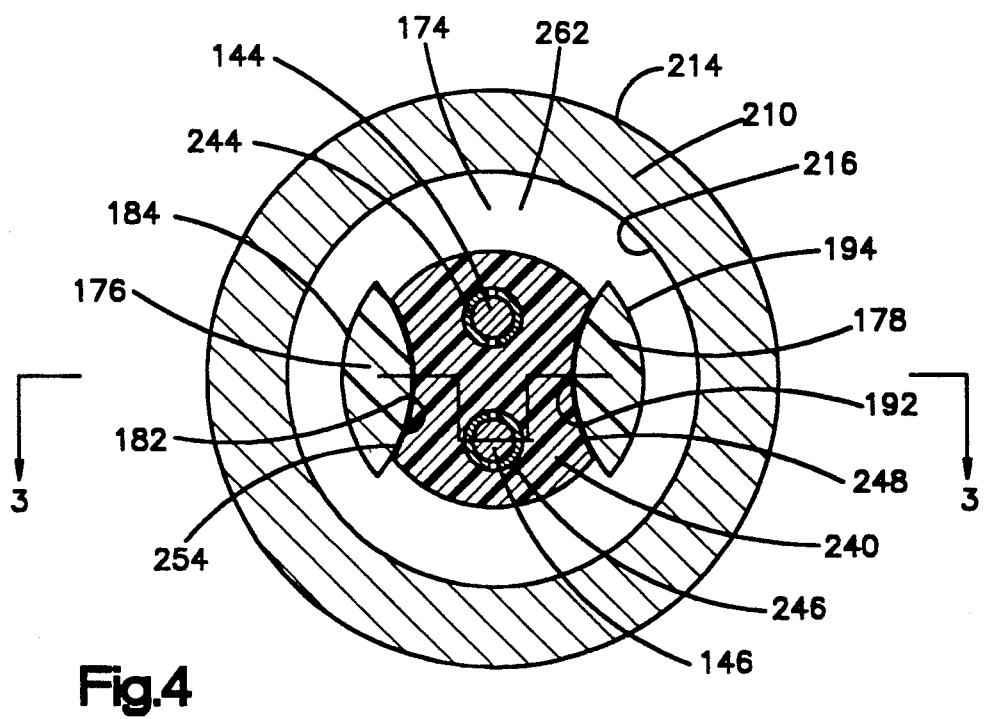
FIG. 4 is a sectional view taken along line 4—4 of FIG. 3.
Figure 5:
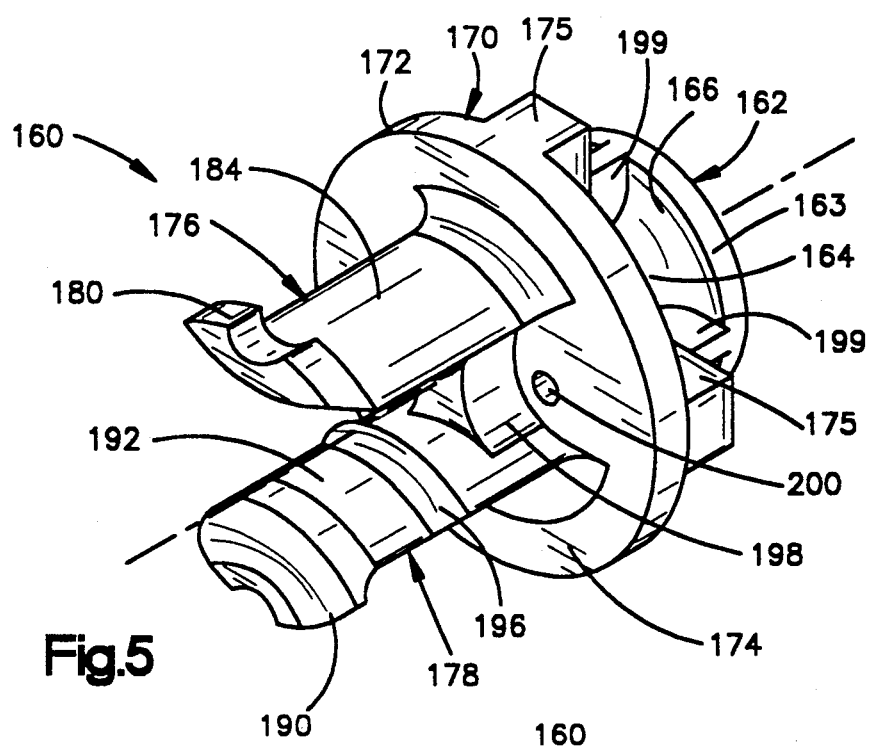
FIG. 5 is an isometric view of the interface element of FIG. 3.

The latch pin 160 is in abutting engagement with an adaptor 150 (FIGS. 2-4). The adaptor 150 attaches the igniter 142 to the housing of the inflator 10. The adaptor 150 is preferably made of a weldable metal suitable for cold heading, such as UNS S30430 stainless steel.

The adaptor 150 includes a tubular socket portion 210 and an annular flange portion 212 at one end of the socket portion. The socket portion 210 has a cylindrical outer circumferential surface 214 and a cylindrical inner circumferential surface 216. An annular shoulder 218 extends radially inward from the inner surface 216 adjacent the end of the socket portion 210 opposite the flange portion 212. The opening defined by the radially inner surface of the shoulder 218 is slightly larger in diameter than the head portion 162 of the latch pin 160, but is smaller in diameter than the body portion 170 of the latch pin. Thus, the head portion 162 can be inserted into the opening until the abutments 175 of the body portion 170 are in abutting engagement with the shoulder 218 of the adaptor 150. A frustoconical surface 220 of the adaptor 150 extends axially from the shoulder 218 to the end of the socket portion 210 opposite the flange portion 212. The conical surface 220 tapers radially outwardly as it extends away from the shoulder 218.

A body of plastic material 230 encases and is intimate contact with the adaptor 150, the latch pin 160, and the igniter 142, and attaches these three parts to each other. In the preferred embodiment the body of plastic material 230 is injection molded. The plastic material 230 is preferably nylon 6/6 with a 33% glass fill, which can be obtained from E.I. DuPont de Nemours & Co., under the brand name ZYTEL. Other materials which can be injection molded at low pressures and temperatures and which will adhere to the adaptor 150, the latch pin 160, and the igniter 142 are also suitable for use. Alternatively, the body of material 230 could be an epoxy adhesive, or another material which is not injection molded. Such an epoxy material may adhere better to the metal adaptor 150. Also, the adaptor may be mechanically attached to the body of material as by crimping a portion of the adaptor into a groove in the body of material.

To secure the igniter 142 and the latch pin 160 to the adaptor 150, the three parts are positioned relative to adaptor 150, the three parts are positioned relative to each other in a die (not shown). The terminals 144 and 146 extend through their respective openings in the latch pin 160. The plastic material 230 in a molten form is injected into the die. The plastic material 230 adheres to the conical sea 220 and to the shoulder 218 of the adaptor 150. The plastic material 230 also adheres to the igniter 142, to the igniter terminals 144 and 146, and to the latch pin 160. Although it is not shown, there may be provided a thin layer of epoxy adhesive between the plastic material 230 and certain metal parts such as the adaptor 150 to help ensure a gas-tight seal.

A portion 232 of the plastic material 230 is located radially outward of the head portion 162 of the latch pin 160 and above the conical seat 220 and shoulder 218 of the adaptor 150, as viewed in FIG. 3. Another portion 234 of the plastic material 230 is located radially inward of the shoulder 218 of the adaptor 150 and between the head portion 162 and body portion 170 of the latch pin 160, around the neck portion 164 and between the webs 199. Yet another portion 236 of the plastic material 230 is located axially above the head portion 162 of the latch pin 160, as viewed in FIG. 3.

After the igniter 142 is secured to the adaptor 150, the adaptor is attached to the combustion chamber cover 46 (FIG. 2), preferably by welding. The adaptor flange 212 is continuously welded to the cover 46 at the circumferential weld location 143. The cover 46 is then welded to the combustion cup 44. The igniter 142 is thereby secured in position in the inflator 10. It should be noted that the adaptor 150 can be secured to the cover 46 by other means. For example, it is contemplated that the adaptor 150 and cover 46 may have complementary threaded portions which permit the adaptor and cover to be screwed together.

With the igniter 142 secured in position in the inflator 10, the plastic material 230, including the portion 232, engages the shoulder 218 and the conical surface 220 of the adaptor 150 to block movement of the igniter 142 from its desired location in a direction axially outward of the inflator 10. This also inhibits unauthorized or improper removal of the igniter 142 from the inflator 10. The plastic material 230 including the portion 234, engages the lower surface 166 of the head portion 162 of the latch pin 160 to block movement of the latch pin from its desired location in a direction axially outwardly of the inflator 10 and the adaptor 150.

With the latch pin 160 and the igniter 142 secured in position in the inflator 10, the latch pin maintains the connector 152 (FIGS. 3 and 4) in electrical contact with the terminals 144 and 146 of the igniter 142. The connector 152 has a projecting portion 240, made of an electrically insulating material, which fits between the two legs 176 and 178 of the latch pin 160. Two split cylindrical metal sleeves 244 and 246 ar molded into the projecting portion 240 of the connector 152. The metal sleeves 244 and 246 connect to lead wires (not shown) which extend away from the connector and which are connectable to vehicle circuitry which generates an actuating signal for the igniter 142. The metal terminals 144 and 146 of the igniter 142 are received in the metal sleeves 244 and 246, respectively, of the connector 152 to establish electrical contact between the igniter 142 and the vehicle circuitry.

With the connector portion 240 disposed between the legs 176 and 178, the rib 196 on the leg 178 of the latch pin 160 fits into a groove 248 on an outer side 250 of the connector portion 240. Similarly, the rib 186 on the other leg 176 of the latch pin 160 fits into a groove 252 on an oppositely facing outer side 254 of the connector portion 240. The engagement between the ribs 196 and 186 and the grooves 248 and 252, respectively, resists movement of the connector portion 240 axially outwardly of the inflator 10, that is, out of engagement with the latch pin 160 and the terminals 144 and 146.

The latch pin 160 is a separate piece from the body of injection molded plastic material 230. Thus, the latch pin 160 can be made of a different material than the plastic material 230. Preferably, the latch pin 160 is made of a polyphenylene sulfide resin such as RYTON R4XT which is available from Phillips 66. This material can be molded at higher temperatures and pressures than are suitable for use in the presence of the igniter. Thus, the latch pin 160 can have greater strength and dimensional stability than if it were molded from the nylon material of the body 230. Another suitable polyphenylene sulfide resin is FORTRON brand resin. Other materials which have been evaluated and appear suitable for making the latch pin 160 are PES (polyethersulphone); PEI (polyetherimide); PBT (polybutylene terephthalate); and PET (polyethylene terephthalate).

Because the latch pin 160 is a separate piece from the body of injection molded plastic material 230, latch pins 160 can be provided which have different structures. The same type of igniter can then be electrically connected with differently shaped connectors, such as the connector 152, without altering the mold by which the body of injection molded plastic material 230 is formed. Further, it would be difficult to mold structure in the shape of the legs 176 and 178 in one piece with the body 230 of injection molded plastic material because the adaptor 150 would also be present and have to be attached at the same time. Accordingly, making the latch pin 160 a separate piece from the body 230 of injection molded plastic material facilitates the molding process in such a case.

A shorting clip 260 (FIG. 2) is preferably provided with the initiator assembly 140. The shorting clip 260 prevents accidental actuation of the igniter 142 prior to engagement of the connector 152 with the initiator assembly 140. The shorting clip 260 is a known, commercially 0001, Shorting Clip In Insulated Housing, available from Allied Amphenol Products. The shorting clip 260 is inserted in an annular space 262 (FIGS. 2 and 3) between the inner surface 216 of the adaptor socket portion 210 and the legs 176 and 178 of the latch pin 160, shortly after the molding process is completed. The shorting clip 260 has a pair of interconnected and radially inwardly extending metal arms 264 and 266 (FIG. 2). The arms 264 and 266 engage the terminals 144 and 146 of the igniter 142 and connect them electrically. When the connector 152 is later attached to the initiator assembly 140 the connector portion 240 spreads apart the arms 264 and 266 to disconnect the short circuit established by the shorting clip 260. The connector 152 simultaneously connects the terminals 144 and 146 with the vehicle circuitry. Since the shorting clip 260 and its use in this application are known in the art, they will not be further discussed herein.

From the above description of the invention, those skilled in the art will perceive other applications, improvements, changes and modifications in the invention, such as the use of the body of plastic material for securing a pressure switch to another part. Such other applications, improvements, changes and modifications within the skill of the art ar intended to be covered by the appended claims.

We claim:

1. Apparatus for association with an electrical connector and for, when actuated, initiating actuation of an inflator for discharging gas to inflate a vehicle occupant restraint such as an air bag, said apparatus comprising:

an initiator actuatable to initiate actuation of the inflator in response to receiving an electrical signal, said initiator having an electrical terminal for electrical contact with the electrical connector to receive the electrical signal from the electrical connector;

means for supporting said initiator adjacent the inflator;

a body of plastic material attaching said initiator and said means for supporting to each other; and a separate interface element for maintaining the electrical connector in electrical contact with said terminal, said body of plastic material having a portion attaching said interface element to said initiator.

2. Apparatus as defined in claim 1 wherein said interface element has an axially inwardly disposed head portion engaged by said body of plastic material and an axially outwardly disposed leg portion free of engagement with said body of plastic material and for engagement with the electrical connector.

3. Apparatus as defined in claim 2 wherein the interface element includes surface means for defining at least one axially extending opening in said interface element, said leg portion of said interface element comprising first and second spaced legs for receiving the connector between them, said terminal extending through said opening and having a portion disposed between said first and second legs for electrical contact with said connector.

4. Apparatus as defined in claim 1 wherein said interface element has a portion in abutting engagement with said means for supporting for blocking movement of said means for supporting in a direction away from said initiator.

5. Apparatus as defined in claim 1 wherein said interface element includes means for maintaining said initiator in position relative to said means for supporting.

6. Apparatus as defined in claim 1 wherein the inflator comprises an inflator housing, said means for supporting said initiator securing said initiator to said housing.

7. Apparatus as defined in claim 6 wherein said means for supporting comprises a metal adaptor welded to said housing.

8. Apparatus as defined in claim 1 wherein said interface element is made from an injection molded polyphenylene sulfide resin.

9. Apparatus for association with an electrical connector and for, when actuated, initiating actuation of an inflator for discharging gas to inflate a vehicle occupant restraint such as an air bag, said apparatus comprising:

an initiator actuatable to initiate actuation of the inflator in response to receiving an electrical signal, said initiator having an electrical terminal for electrical contact with the electrical connector to receive the electrical signal from the electrical connector;

means for supporting said initiator adjacent the inflator;

a body of plastic material attaching said initiator and said means for supporting to each other;

an interface element for maintaining the electrical connector in electrical contact with said terminal, said interface element being made of a material different from said body of plastic material; and means for attaching said interface element to said initiator.

10. Apparatus as defined in claim 9 wherein said means for attaching said interface element to said initiator comprises said body of plastic material.

11. Apparatus as defined in claim 10 wherein said interface element is made from a polyphenylene sulfide resin and said body of plastic material is made from nylon.

12. Apparatus as defined in claim 10 wherein said interface element has an axially inwardly disposed head portion engaged by said body of plastic material, an axially outwardly disposed leg portion free of engagement with said body of plastic material and for engagement with the electrical connector, and an intermediate body portion in abutting engagement with said means for supporting, said interface element comprising surface means for defining at least one opening in said interface element, said leg portion of said interface element comprising first and second spaced legs for receiving the connector between them, said terminal extending through said opening and having a portion disposed between said first and second legs.

13. An apparatus as defined in claim 9 wherein said body of plastic material is injection molded.

14. An apparatus as defined in claim 9 wherein said body of plastic material is an epoxy adhesive.

* * * * *